United States Patent
Wang

(10) Patent No.: US 11,131,558 B2
(45) Date of Patent: Sep. 28, 2021

(54) NAVIGATION SYSTEM WITH MAP GENERATION MECHANISM AND METHOD OF OPERATION THEREOF

(71) Applicant: Telenav, Inc., Santa Clara, CA (US)

(72) Inventor: Liang Wang, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 2 days.

(21) Appl. No.: 15/669,433

(22) Filed: Aug. 4, 2017

(65) Prior Publication Data

US 2019/0041229 A1 Feb. 7, 2019

(51) Int. Cl.
| | |
|---|---|
| *G01C 21/36* | (2006.01) |
| *G06T 3/40* | (2006.01) |
| *G06T 11/60* | (2006.01) |
| *G06T 11/00* | (2006.01) |

(52) U.S. Cl.
CPC ....... *G01C 21/367* (2013.01); *G01C 21/3676* (2013.01); *G06T 3/40* (2013.01); *G06T 11/001* (2013.01); *G06T 11/60* (2013.01); *G01C 21/3661* (2013.01)

(58) Field of Classification Search
None
See application file for complete search history.

(56) References Cited

U.S. PATENT DOCUMENTS

| | | | | |
|---|---|---|---|---|
| 2004/0197021 | A1* | 10/2004 | Huang | H04N 1/6077 382/162 |
| 2011/0280453 | A1* | 11/2011 | Chen | G06T 7/75 382/113 |
| 2014/0119639 | A1* | 5/2014 | Shah | G06K 9/0063 382/154 |
| 2016/0207458 | A1* | 7/2016 | Pillai | H04N 5/225 |

* cited by examiner

*Primary Examiner* — Aaron M Richer
(74) *Attorney, Agent, or Firm* — Perspectives Law Group, Corp.

(57) ABSTRACT

A method of operation of a navigation system includes: determining a content attribute based on an attribute index included in a map content; determine an attribute proportion of the content attribute relative to a content dimension with a control unit; removing the content attribute with the attribute proportion meeting or exceeding a proportion threshold; and generate a remap content based on a remaining instance of the content attribute for displaying on a device.

20 Claims, 7 Drawing Sheets

NAVIGATION SYSTEM WITH MAP GENERATION MECHANISM AND METHOD OF OPERATION THEREOF

TECHNICAL FIELD

The present invention relates generally to a navigation system, and more particularly to a system with map generation mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving map generation mechanism to control an operation of vehicle has become a paramount concern for the consumer. The inability decreases the benefit of using the tool.

Thus, a need still remains for a navigation system with map generation mechanism to a device during operation of vehicle. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a content attribute based on an attribute index included in a map content; determine an attribute proportion of the content attribute relative to a content dimension based on a control unit; removing the content attribute with the attribute proportion meeting or exceeding a proportion threshold; and generate a remap content based on a remaining instance of the content attribute for displaying on a device.

The present invention provides a navigation system, including: a control unit for: determining a content attribute based on an attribute index included in a map content; determine an attribute proportion of the content attribute relative to a content dimension; removing the content attribute with the attribute proportion meeting or exceeding a proportion threshold; and generate a remap content based on a remaining instance of the content attribute. a communication unit, coupled to the control unit, for transmitting the remap content for displaying on a device.

The present invention provides a navigation system having a non-transitory computer readable medium including instructions for execution, the instructions comprising: determining a content attribute based on an attribute index included in a map content; determine an attribute proportion of the content attribute relative to a content dimension; removing the content attribute with the attribute proportion meeting or exceeding a proportion threshold; and generate a remap content based on a remaining instance of the content attribute for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
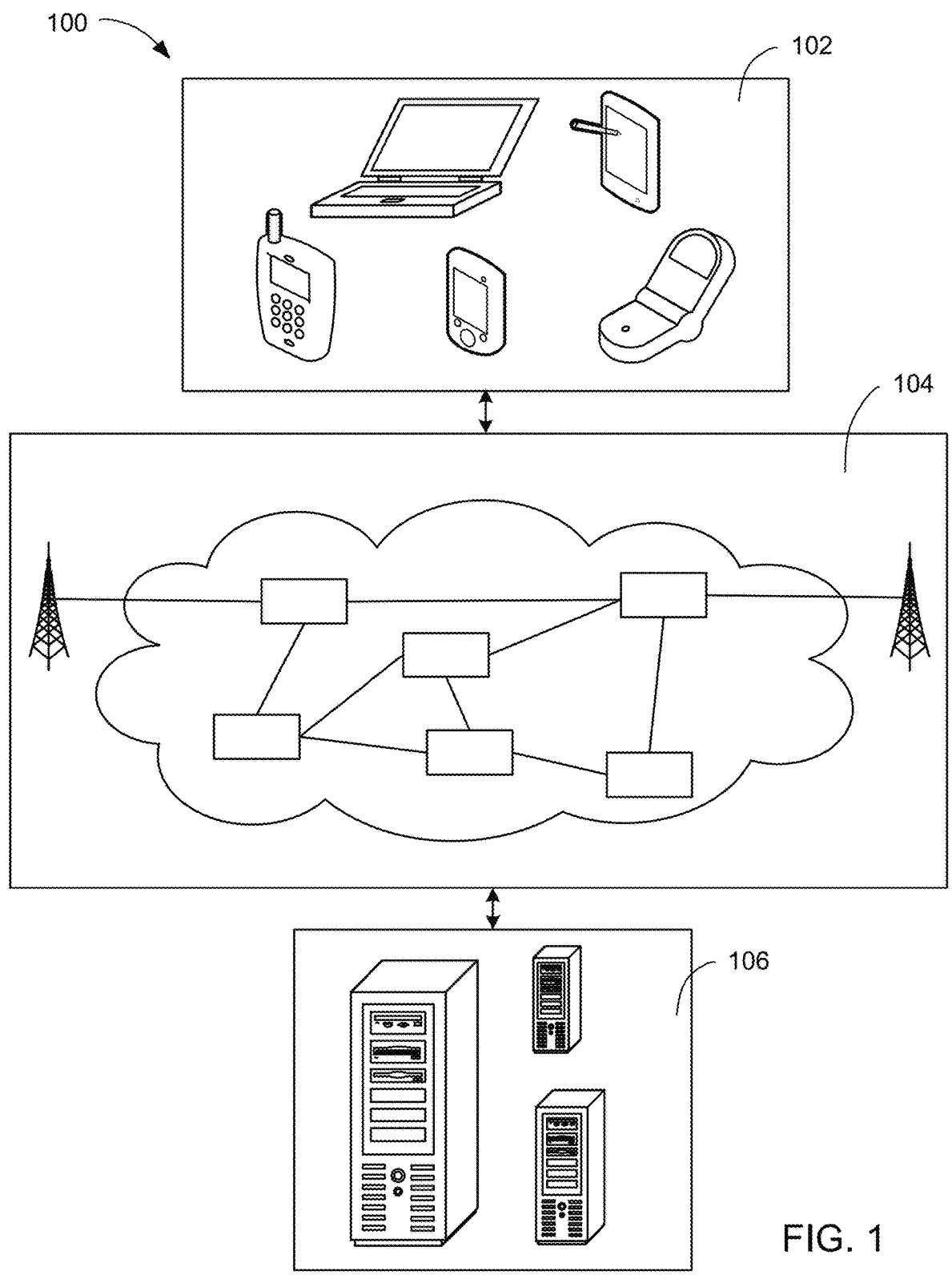
FIG. 1 is a navigation system with map generation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with map generation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
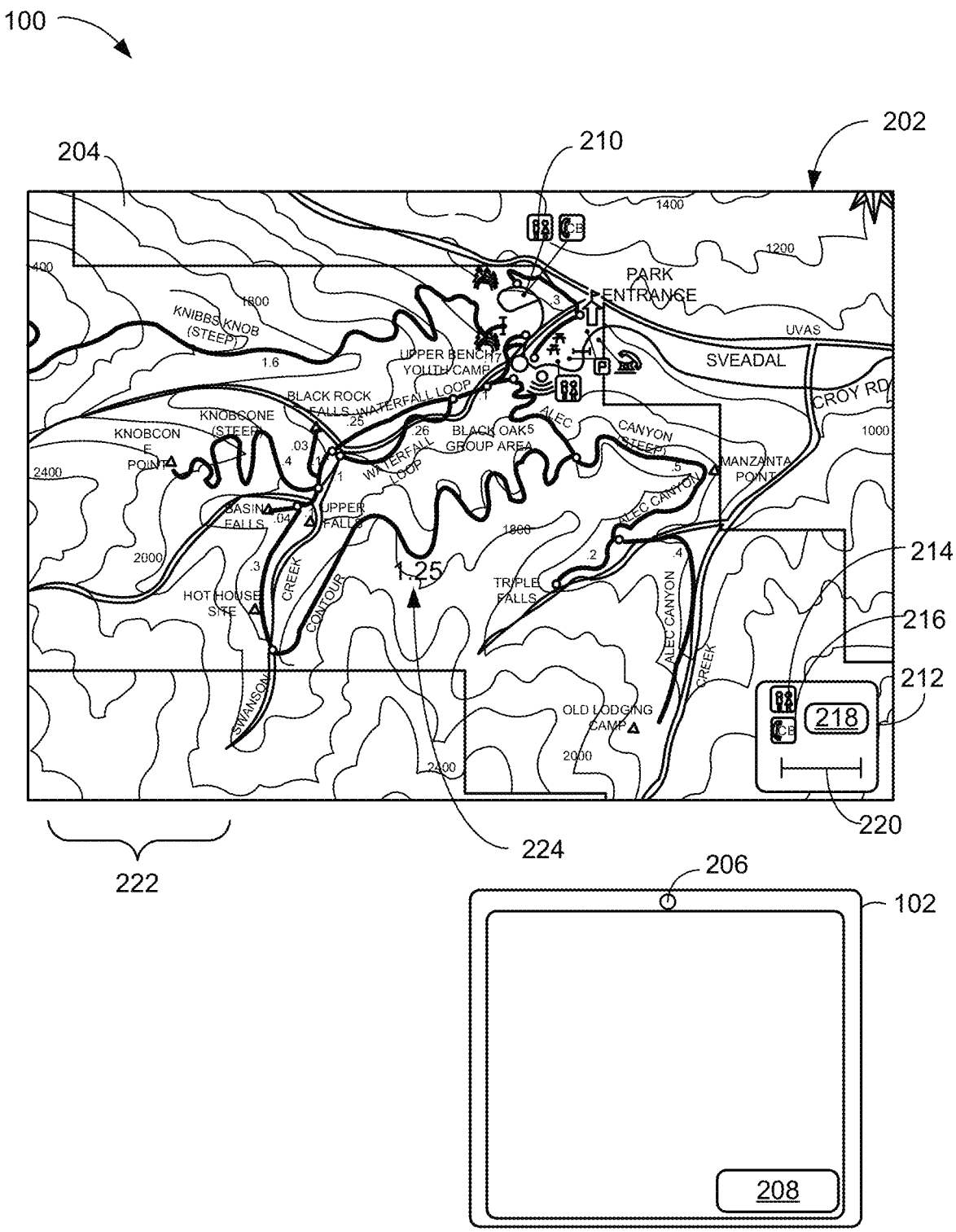
FIG. 2 is an example of a map content.

Referring now to FIG. 2, there is shown an example of a map content 202. For clarity and brevity, the discussion of the embodiment of the present invention will focus on the first device 102 delivering the result generated by the navigation system 100. However, the second device 106 of FIG. 1 and the first device 102 can be discussed interchangeably. The first device 102 and the second device 106 can communicate via the communication path 104.

The map content 202 is defined as source map information. For example, the map content 202 can represent a detailed version of map information that navigation system 100 would like to extract information related to a geographic area 204. The geographic area 204 is defined as physical area. For example, the map content 202 can aid the user of the first device 102 to navigate within the geographic area 204. For further example, the map content 202 can include the map information provided at a local park, state park, national park, or a combination thereof.

A capturing device 206 can capture, track, monitor, detect, or a combination thereof the map content 202. For example, the capturing device 206 can include a digital camera, video camera, thermal camera, night vision camera, infrared camera, x-ray camera, or the combination thereof.

An operation mode 208 is defined as a state of the first device 102. For example, the operation mode 208 can represent having the access to the communication path 104 of FIG. 1 turned on or turned off. For a specific example, the operation mode 208 can include the online mode and offline mode.

A content attribute 210 is defined as a component or a feature of the map content 202. For example, the content attribute 210 can include a path in the geographic area 204. For another example, the content attribute 210 can represent a forest within the geographic area 204. For a different example, the content attribute 210 can include point of interest such as a camping ground, parking lot, or a combination thereof.

An attribute index 212 is defined as a listing of an attribute indicator 214. The attribute indicator 214 is defined as a symbol that represents the content attribute 210. For example, the map content 202 can represent a park. For a specific example, the attribute index 212 of the park can include the attribute indicator 214 representing a toilet inside the park. The attribute index 212 can include multiple instances of the attribute indicator 214 to aid the user of the first device 102 to navigate within the geographic area 204.

An attribute type 216 is defined as a classification of the map information. For example, the attribute type 216 can include manmade object, nature object, or a combination thereof. The man made object can include the path, trail, parking lot, or a combination thereof. The nature object can include the forest, river, mountain, or a combination thereof.

A content coloration 218 is defined as color of the map information. The content coloration 218 can be represented by multiple instances of a pixel presented on a display. For example, the content attribute 210 representing the forest can be represented by the content coloration 218 of green. For another example, the attribute indicator 214 for manmade object can be represented by the content coloration 218 of black.

A geographic scale 220 is defined as a measurement scaled for the map content 202. For example, the map content 202 can represent a scaled-down representation of the geographic area 204. More specifically as an example, the map content 202 can be proportionally reduced in a content dimension 222 to represent the geographic area 204. An attribute distance 224 is defined as a physical distance. For example, the geographic scale 220 can include an attribute distance 224 reduced proportionally for the map content 202 to represent a physical distance between one instance of the content attribute 210 to another instance of the content attribute 210 within the geographic area 204.

The content dimension 222 can include a size, height, width, length, or a combination thereof of the map information. For example, the content dimension 222 can represent the size of the map content 202. For a different example, the content dimension 222 can represent the proportional size of the content attribute 210 within the map content 202. More specifically as an example, the physical area of the forest can represent 100 square miles. The content dimension 222 can represent the proportional scaled-down size of the physical area of the forest to be presented on the map content 202.

Figure 3:
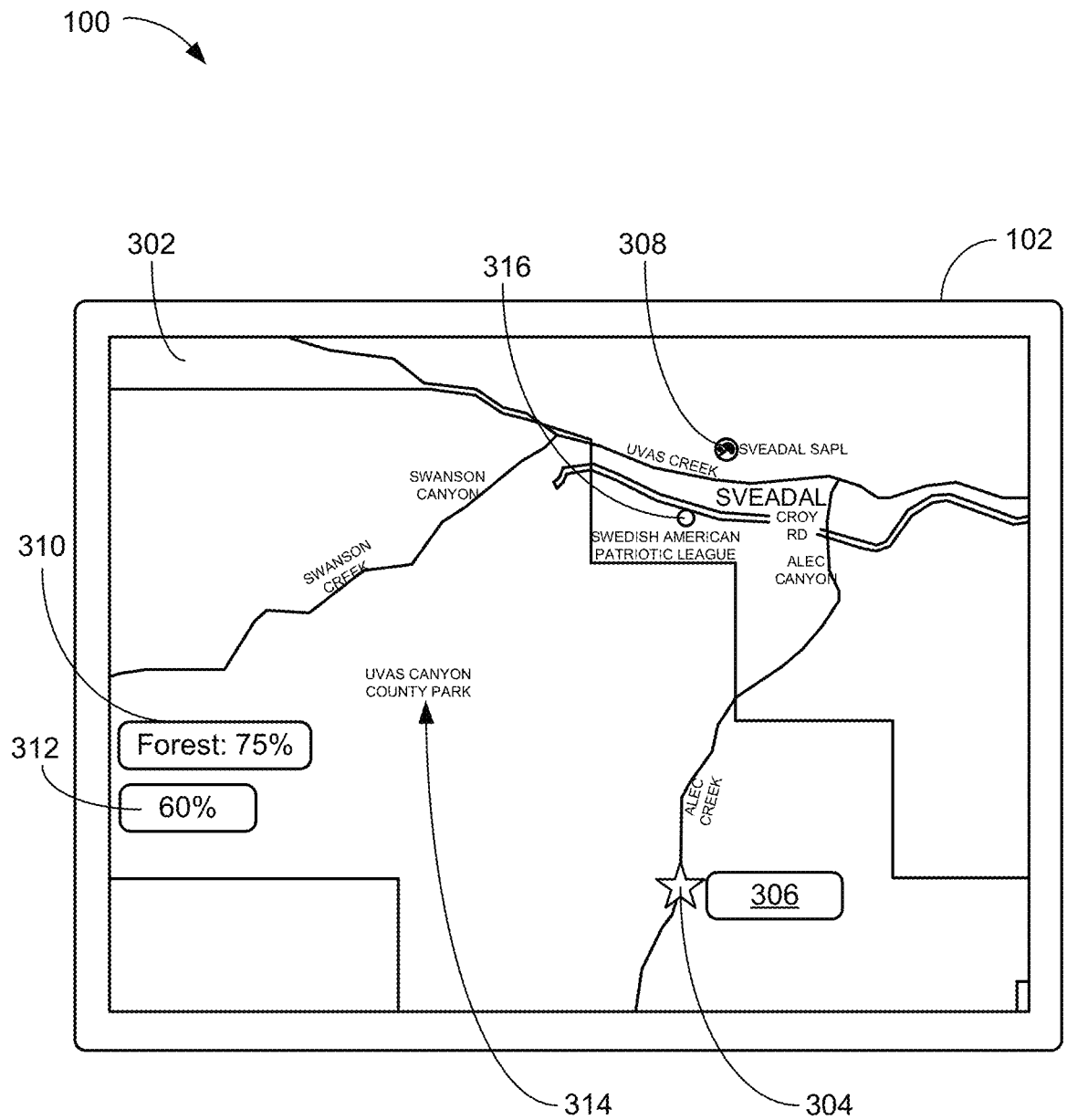
FIG. 3 is an example of a stored content.

Referring now to FIG. 3, therein is shown an example of a stored content 302. The stored content 302 is defined as the map information available on the first device 102. For example, the stored content 302 can represent the map information regarding the geographic area 204 of FIG. 2 stored on the first device 102 usable by the user of the navigation system 100.

A current location 304 is defined as a physical location of the first device 102. For example, the current location 304 can be presented on the stored content 302 to indicate where the first device 102 is within the geographic area 204. Location coordinates 306 are defined as a geographic location including two coordinate values representing the latitude and longitude.

A stored attribute 308 is defined as a component or feature of the map information stored. For example, the stored attribute 308 can include the component or the feature of the map content 202 of FIG. 2, the stored content 302, or a combination thereof stored on the first device 102.

An attribute proportion 310 is defined as an amount of the content attribute 210 relative to the content dimension 222 of FIG. 2. For example, the attribute proportion 310 can be represented as a percentage of a whole. For another example, the attribute proportion 310 can represent a quantity that is part or share of the whole. For further example, the attribute proportion 310 can represent the percentage of the content coloration 218 of FIG. 2 represented in the map content 202, the stored content 302, or a combination thereof. For a specific example, if the geographic area 204 represents a forest, the content coloration 218 representing green can 75% of the map content 202, the stored content 302, or a combination thereof relative to the content dimension 222.

A proportion threshold 312 is defined as a limit of the attribute proportion 310. For example, the proportion threshold 312 can represent a minimum or maximum limit of the attribute proportion 310. A background content 314 can represent the map information having the attribute proportion 310 meeting or exceeding the proportion threshold 312. For further example, the background content 314 can represent the content attribute 210, the stored attribute 308 having the attribute proportion 310 meeting or exceeding the proportion threshold 312. For a specific example, the proportion threshold 312 can represent 60%. If the attribute proportion 310 meets or exceeds 60%, the content attribute 210 can be deemed as the background content 314. For another example, the background content 314 can represent the content attribute 210 situated in the rear and not at the foreground for a presentation of the map information.

A non-background content 316 can represent the map information having the attribute proportion 310 below the proportion threshold 312. For further example, the non-background content 316 can represent the content attribute 210, the stored attribute 308 having the attribute proportion 310 below the proportion threshold 312. For another example, the non-background content 316 can represent the content attribute 210 situated in the foreground for a presentation of the map information.

Figure 4:
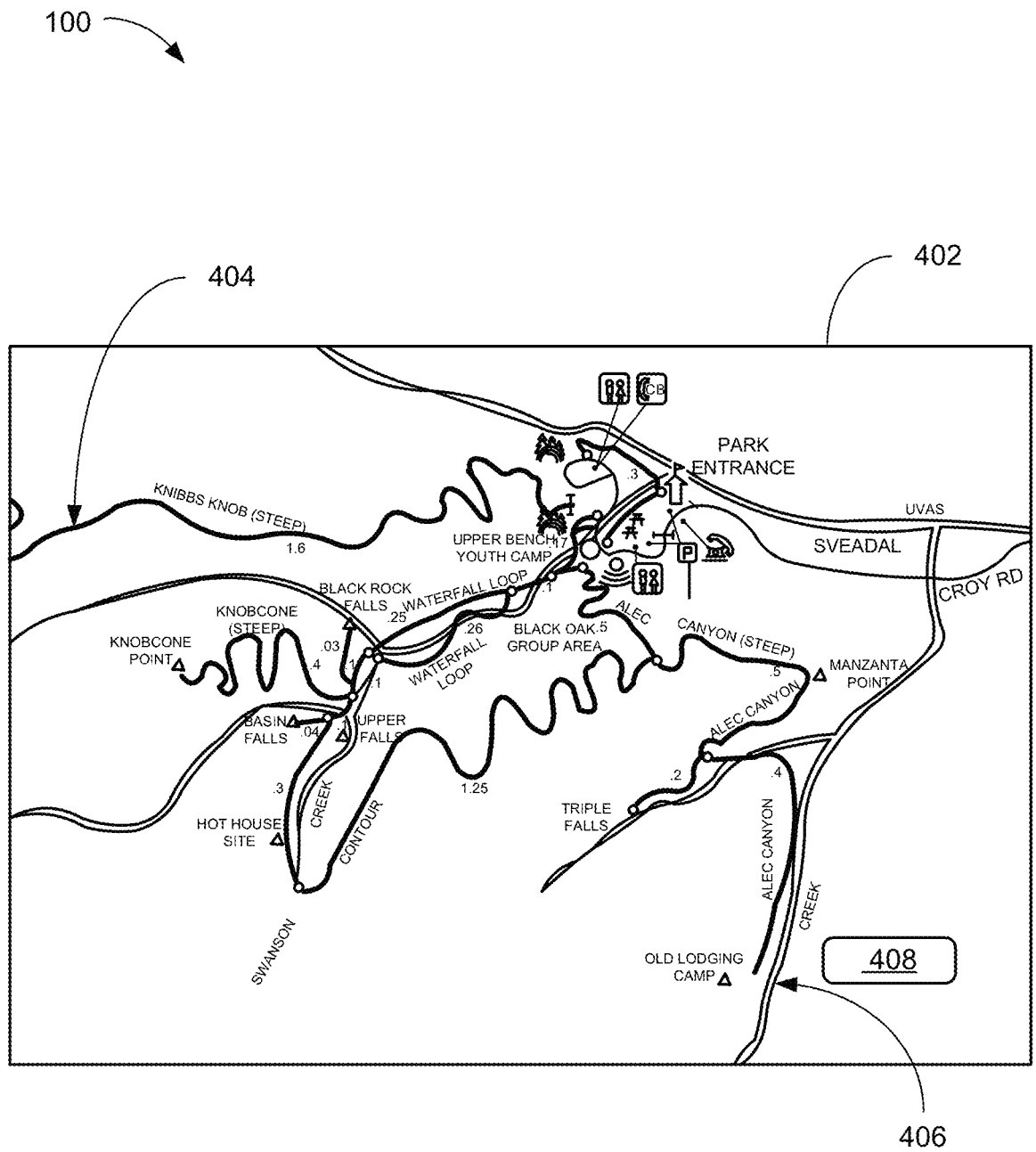
FIG. 4 is an example of a remap content.

Referring now to FIG. 4, therein is shown an example of a remap content 402. The remap content 402 is defined as the map information regenerated by the navigation system 100. For example, the navigation system 100 can generate the remap content 402 based on a map difference 404 between the map content 202 of FIG. 2 and the stored content 302 of FIG. 3. The map difference 404 is defined as a dissimilarity between the map content 202 and the stored content 302

A remapping attribute 406 is defined as a component or feature of the remap content 402. For example, the remapping attribute 406 can represent the map difference 404. An attribute priority 408 is defined as an order of importance for the map information. For example, the content attribute 210 representing a trail or path can have the attribute priority 408 higher than the content attribute 210 representing a lake or grassland.

Figure 5:
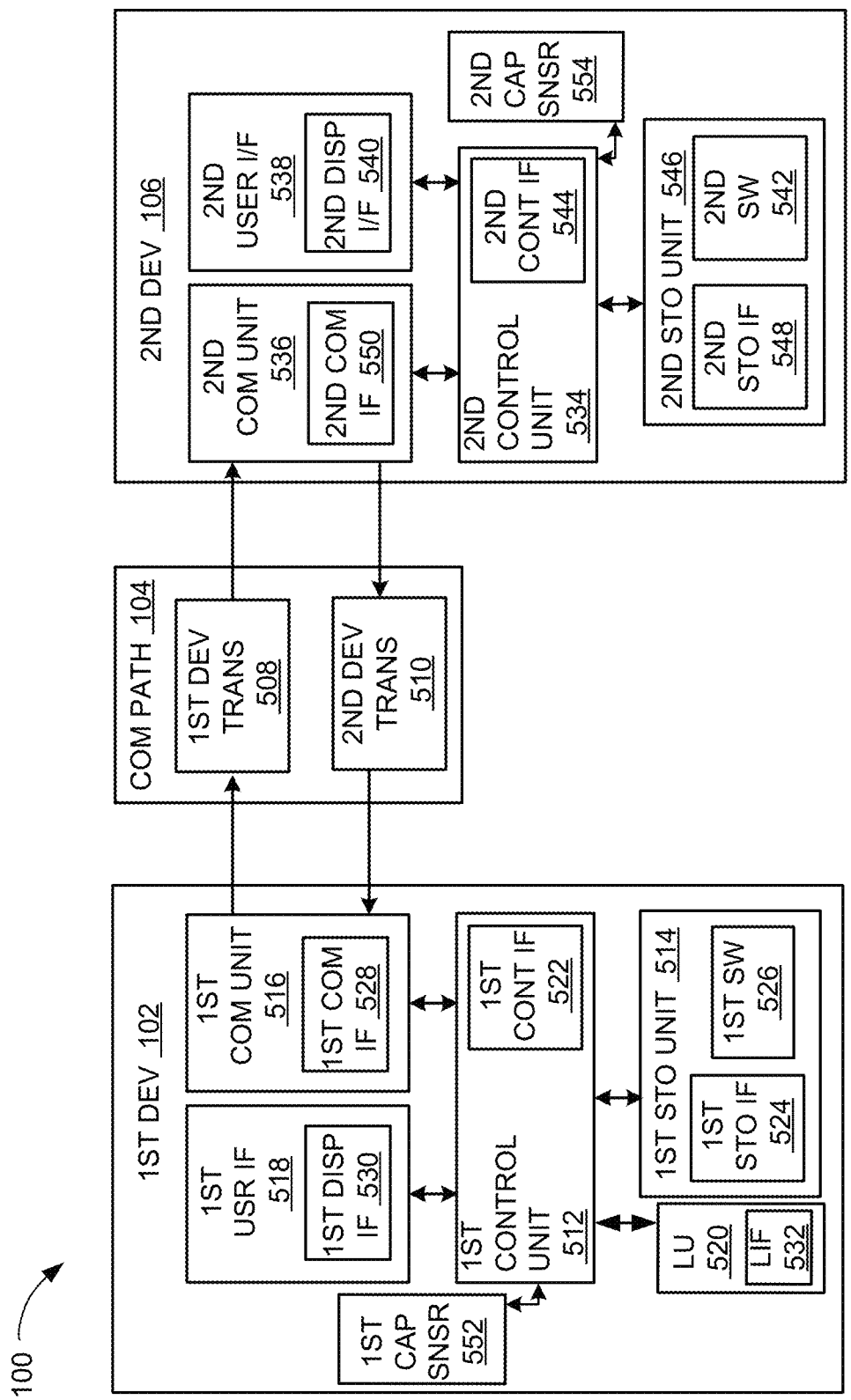
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations physically separate from the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, a camera, or any combination thereof to provide data and communication inputs.

The first user interface 518 can include a first display interface 530. The first display interface 530 can include a display, a projector, a video screen, a speaker, a headset, or any combination thereof.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, a camera, or any combination thereof to provide data and communication inputs. Examples of the output device of the second user interface 538 can include a second display interface 540. The second display interface 540 can include a display, a projector, a video screen, a speaker, a headset, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

A first capturing device 552 can represent the capturing device 206 of FIG. 2. Examples of the first capturing device 552 can include a digital camera, video camera, thermal camera, night vision camera, infrared camera, x-ray camera, or the combination thereof. Examples of the first capturing device 552 can further include accelerometer, thermometer, microphone, wireless signal receiver, remote physiological monitoring device, light identifier, magnetic sensor, or the combination thereof.

A second capturing device 554 can represent the capturing device 210. Examples of the second capturing device 554 can include a digital camera, video camera, thermal camera, night vision camera, infrared camera, x-ray camera, or the combination thereof. Examples of the second capturing device 554 can further include accelerometer, thermometer, microphone, wireless signal receiver, remote physiological monitoring device, light identifier, magnetic sensor, or the combination thereof.

Figure 6:
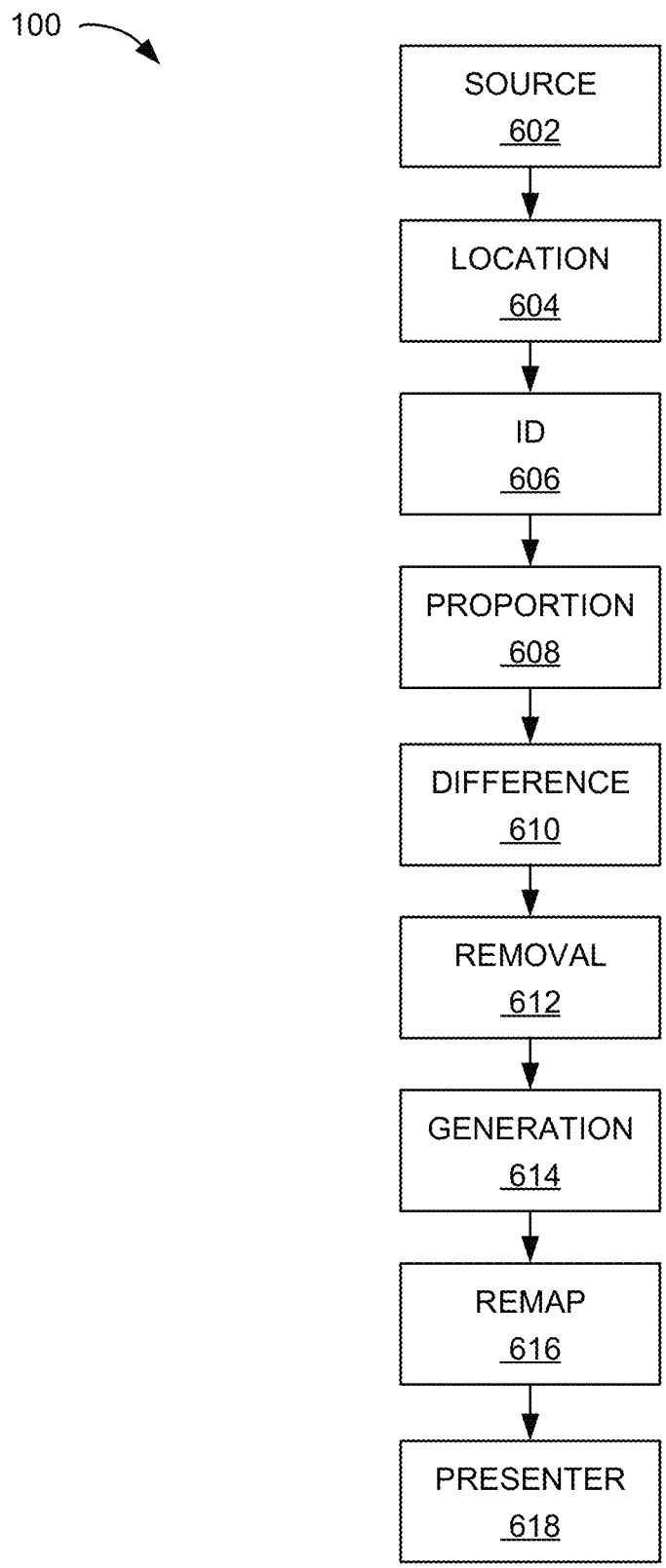
FIG. 6 is a control flow of the navigation system.

Referring now to FIG. 6, therein is shown a control flow of the navigation system 100. The navigation system 100 can include a source module 602. The source module 602 receives the map content 202 of FIG. 2. For example, the source module 602 can receive the map content 202 from the capturing device 206 of FIG. 2, the external source, or a combination thereof.

The source module 602 can receive the map content 202 in a number of ways. For example, the source module 602 can receive the map content 202 captured by the capturing device 206. For a specific example, the first device 102 can include the capturing device 206. The capturing device 206 can capture the map content 202 for the navigation system 100 to process.

For a different example, the source module 602 can receive the map content 202 from the external source including the first device 102 of another user, map providing services including Google Maps™, Apple Maps™, or a combination thereof, the government entity including the National Park Services for the country, or a combination thereof.

For further example, the source module 602 can receive the map content 202 from the capturing device 206 when the operation mode 208 of FIG. 2 represents offline. For a different example, the source module 602 can receive the map content 202 from the external source when the operation mode 208 represents online. The source module 602 can transmit the map content 202 from the capturing device 206, the external source, or a combination thereof to a location module 604.

The navigation system 100 can include the location module 604, which can be coupled to the source module 602. The source module 602 can detect the current location 304 of FIG. 3. For example, the source module 602 can detect the current location 304 with the location unit 520 of FIG. 5 to determine the geographic coordinates of the first device 102 of the user. If the operation mode 208 is offline, the location module 604 can determine the current location 304 based on dead reckoning. The location module 604 can transmit the current location 304 to an identification module 606.

The navigation system 100 can include the identification module 606, which can be coupled to the location module 604. The identification module 606 determines the content attribute 210 of FIG. 2. For example, the identification module 606 can determine the content attribute 210 based on the map content 202, the attribute index 212 of FIG. 2, or a combination thereof.

The identification module 606 can determine the content attribute 210 in a number of ways. For example, the identification module 606 can determine the content attribute 210 based the attribute index 212 included in the map content 202. The attribute index 212 can include the attribute type 216 of FIG. 2 including the attribute indicator 214 of FIG. 2. Each instance of the attribute indicator 214 can represent a different instance of the attribute type 216. For example, the map content 202 can include the attribute indicator 214 representing a trail. For a different example, the attribute indicator 214 can represent a point of interest. For further example, the attribute indicator 214 can represent a camping site, a parking lot, or a combination thereof. The identification module 606 can determine which of the attribute indicator 214 that the content attribute 210 represents by comparing the content attribute 210 to the attribute indicator 214 provided in the attribute index 212. More specifically as an example, the identification module 606 can determine the content attribute 210 using the image recognition technology to match the content attribute 210 to the attribute indicator 214 presented in the attribute index 212.

For a different example, the identification module 606 can determine the content attribute 210 based on the attribute index 212, the stored attribute 308 of FIG. 3, or a combination thereof. More specifically as an example, the first storage unit 514 of FIG. 5, the second storage unit 546 of FIG. 5, or a combination thereof can store the stored attribute 308. The identification module 606 can determine which of the attribute indicator 214 that the content attribute 210 represents by comparing the content attribute 210 to the stored attribute 308 using the image recognition technology. The identification module 606 can determine the content attribute 210 by comparing to the attribute index 212, the stored attribute 308, or a combination thereof.

For another example, the identification module 606 can determine the content coloration 218 of FIG. 2. For example, the identification module 606 can determine the content coloration 218 based on the content attribute 210, the attribute index 212, the stored attribute 308, or a combination thereof. More specifically as an example, the attribute index 212, the stored attribute 308, or a combination thereof can indicate the color of the attribute indicator 214.

For a specific example, the identification module 606 can pick out the content coloration 218 based on the color pixel for each of the attribute indicator 214. By determining which of the attribute indicator 214 that the content attribute 210 represents, the identification module 606 can determine the content coloration 218 of the content attribute 210. More specifically as an example, the identification module 606 can pick out the content coloration 218 for each pixel's color. The identification module 606 can transmit the content attribute 210 to a proportion module 608.

The navigation system 100 can include the proportion module 608, which can be coupled to the identification module 606. The proportion module 608 determines the attribute proportion 310 of FIG. 3. For example, the proportion module 608 can determine the attribute proportion 310 based on the content attribute 210, the map content 202, the content dimension 222 of FIG. 2, or a combination thereof.

The proportion module 608 can determine the attribute proportion 310 in a number of ways. For example, the content attribute 210 can include the content coloration 218. The content attribute 210 can represent a forest. The content coloration 218 of the forest can represent green. The map content 202 can include the geographic area 204 of FIG. 2 representing a national park. The content dimension 222 of the map content 202 can include the geographic information, such as the area size, of the national park. The proportion module 608 can determine the attribute proportion 310 based on the content dimension 222 represented in number of pixels representing green within the content dimension 222.

For a different example, the proportion module 608 can determine the attribute proportion 310 based on the content attribute 210, the attribute index 212, the stored attribute 308, or a combination thereof. More specifically as an example, the attribute index 212 can indicate the geographic boundary of the geographic area 204 representing the national park. For further example, the stored attribute 308 can include the geographic information on the geographic boundary of the national park. Based on the attribute index 212, the stored attribute 308, or a combination thereof, the proportion module 608 can determine the attribute proportion 310 of the content attribute 210 representing a forest relative to the content dimension 222 of the map content 202. The proportion module 608 can transmit the attribute proportion 310 to a difference module 610.

The navigation system 100 can include the difference module 610, which can be coupled to the proportion module 608. The difference module 610 determines the map difference 404 of FIG. 4. For example, the difference module 610 can determine the map difference 404 based on the map content 202, the stored content 302 of FIG. 3, the attribute proportion 310, or a combination thereof.

The difference module 610 can determine the map difference 404 in a number of ways. For example, the difference module 610 can determine the map difference 404 by comparing the map content 202 to the stored content 302 stored on the first device 102. The attribute proportion 310 of the stored content 302 can be determined similarly as the attribute proportion 310 of the map content 202 discussed above. The attribute proportion 310 of the stored content 302 can be stored in the first storage unit 514, the second storage unit 546, or a combination thereof.

The difference module 610 can determine the map difference 404 based on comparing the attribute proportion 310 of the map content 202 to the attribute proportion of the stored content 302. More specifically as an example, the difference module 610 can determine the map difference 404 by identifying the content attribute 210 existing in the map content 202 but unavailable in the stored content 302. The difference module 610 can transmit the map difference 404 to a removal module 612.

The navigation system 100 can include the removal module 612, which can be coupled to the difference module 610. The removal module 612 removes the content attribute 210. For example, the removal module 612 can remove the content attribute 210 based on the attribute proportion 310, the proportion threshold 312, or a combination thereof.

The removal module 612 can remove the content attribute 210 in a number of ways. For example, the removal module 612 can determine whether the content attribute 210 as the background content 314 of FIG. 3 or the non-background content 316 of FIG. 3. More specifically as an example, the removal module 612 can determine the background content 314 based on the attribute proportion 310 meeting or exceeding the proportion threshold 312 of FIG. 3. For further example, the removal module 612 can determine the content attribute 210 to represent the background content 314 if the content coloration 218 of the content attribute 210 meets or exceeds the proportion threshold 312 representing the number of pixels within the content dimension 222.

For a different example, the removal module 612 can determine multiple instances of the background content 314. More specifically as an example, if the respective instance of the attribute proportion 310 for each of the content attribute 210 meets or exceeds the proportion threshold 312, then each of the content attribute 210 can represent the background content 314.

The removal module 612 can remove the content attribute 210 determined as the background content 314. For further example, if there are multiple instances of the background content 314, the removal module 612 can remove each of the background content 314 from the map content 202, thus, eliminating the content coloration 218 for that instance of the background content 314 from being presented on the first device 102 of FIG. 1 for the user.

For example, the removal module 612 can remove the content attribute 210 based on attribute proportion 310, the attribute type 216, the attribute priority 408 of FIG. 4, or a combination thereof. For a specific example, the removal module 612 can remove the content attribute 210 with the greatest instance of the attribute proportion 310 meeting or exceeding the proportion threshold 312. For a different example, the removal module 612 can remove the content attribute 210 with the least instance of the attribute proportion 310 meeting or exceeding the proportion threshold 312.

For another example, the removal module 612 can remove the content attribute 210 based on the attribute priority 408 of the attribute type 216. For example, certain instance of the attribute type 216 can be have the attribute priority 408 designated as non-removal even if the attribute proportion 310 meets or exceeds the proportion threshold 312. As a result, the removal module 612 will not remove the content attribute 210 with the attribute priority 408 designated as non-removal. In contrast, the removal module 612 can remove the content attribute 210 with the attribute priority 408 designated with a permission to be removed. The removal module 612 can transmit the content attribute 210 that was not removed to a generation module 614.

It has been discovered that the navigation system 100 removing the content attribute 210 based on the attribute proportion 310 meeting or exceeding the proportion threshold 312 improves the presentation of the map information. By removing the content attribute 210, the navigation system 100 can eliminate unnecessary map information from being displayed to the user of the first device 102. As a result, the navigation system 100 can improve the resource allocation of the first device 102 by reducing the required content from being displayed. Furthermore, the navigation system 100 can improve the display arrangement of the map information by reducing clutter from being presented on the first device 102. As a result, the navigation system 100 can improve the safety of the user operating the first device 102, the navigation system 100, or a combination thereof by presenting what's pertinent to the user.

The navigation system 100 can include the generation module 614, which can be coupled to the removal module 612. The generation module 614 generates the remapping attribute 406 of FIG. 4. For example, the generation module 614 can generate the remapping attribute 406 based on the content attribute 210 remaining or not removed by the removal module 612, the map difference 404, or a combination thereof.

The generation module 614 can generate the remapping attribute 406 in a number of ways. For example, the generation module 614 can generate the remapping attribute 406 based on the content attribute 210 remaining from the attribute proportion 310 meeting or exceeding the proportion threshold 312. More specifically as an example, the generation module 614 can generate the remapping attribute 406 based on the content attribute 210 excluding the background content 314.

For a different example, the generation module 614 can generate the remapping attribute 406 based on the map difference 404 having the attribute proportion 310 meeting or exceeding the proportion threshold 312. For example, even if the map difference 404 exists between the map content 202 and the stored content 302, if the attribute proportion 310 of the content attribute 210 representing the map difference 404 meets or exceeds the proportion threshold 312, the generation module 614 can preclude the content attribute 210 to be factored in for the generation of the remapping attribute 406.

In contrast, if the attribute proportion 310 of the content attribute 210 representing the map difference 404 is below the proportion threshold 312, the generation module 614 can factor the content attribute 210 for the generation of the remapping attribute 406. The generation module 614 can transmit the remapping attribute 406 to a remapping module 616.

The navigation system 100 can include the remapping module 616, which can be coupled to the generation module 614. The remapping module 616 generates the remap content 402 of FIG. 4. For example, the remapping module 616 can generate the remap content 402 based on the remapping attribute 406, the geographic scale 220 of FIG. 2, the Location coordinates 306 of FIG. 3, the content coloration 218, or a combination thereof.

The remapping module 616 can generate the remap content 402 in a number of ways. For example, the remapping module 616 can generate the remap content 402 based on plotting the remapping attribute 406 as the content attribute 210 had been originally plotted in the map content 202. More specifically as an example, the remapping module 616 can match the remapping attribute 406 to the content attribute 210 using the image recognition technology. For further example, the remapping module 616 can generate the remap content 402 by plotting the remapping attribute 406 at the same instance of the Location coordinates 306 as the content attribute 210 on the map content 202.

For a different example, the remapping module 616 can generate the remap content 402 based on the remapping attribute 406, the attribute index 212, or a combination thereof. The attribute index 212 can include the geographic scale 220. The remapping module 616 can generate the remap content 402 according to the geographic scale 220 of the map content 202. More specifically as an example, the remapping module 616 can generate the remap content 402 according to the same instance of the content dimension 222 as the map content 202. For further example, the remapping module 616 can generate the remap content 402 having the geographic area 204 represented in the same dimension as the geographic area 204 represented in the map content 202. The remapping module 616 can generate the remap content 402 having the same instance of the content dimension 222 as the map content 202.

For additional example, the remapping module 616 can generate the remap content 402 according to the geographic scale 220 based on the number of pixels. The remap content 402 can include one instance of the remapping attribute 406 representing the point of interest and another instance of the remapping attribute 406 representing another instance of the point of interest. The remapping module 616 can generate the remap content 402 by plotting the two point of interests having the attribute distance 224 of FIG. 2, the geographic scale 220, or a combination thereof having the same number pixels between the two point of interests as would be presented on the map content 202.

For a different example, the remapping module 616 can generate the remap content 402 based on remapping according to the content coloration 218. As discussed above, the content coloration 218 can represent the pixel or pixels displayed on the first device 102. The remapping attribute 406 can include the content coloration 218. For further example, the remapping attribute 406 can include the content coloration 218 same or similar as the content attribute 210, the stored attribute 308, or a combination thereof. The remapping module 616 can generate the remap content 402 by presenting the remapping attribute 406 based on remapping each pixel of the content coloration 218 to display the remapping attribute 406. The remapping module 616 can transmit the remap content 402 to a presenter module 618.

The navigation system 100 can include the presenter module 618, which can be coupled to the remapping module 616. The presenter module 618 presents the remap content 402. For example, the presenter module 618 can present the remap content 402 based on the operation mode 208.

The presenter module 618 can present the remap content 402 in a number of ways. For example, the presenter module 618 can present the remap content 402 based on the operation mode 208 of offline mode. By generating the remap content 402, the first device 102 can display the map information that is more detailed than the stored content 302. For further example, the user of the first device 102 can no longer required to be online to obtain the map information that is more detailed than the stored content 302 to navigate the geographic area 204. But rather, by the presenter module 618 displaying the remap content 402, the user of the first device 102 can navigate the geographic area 204 with the map information that is more detailed than the stored content 302 previously available on the first device 102. For a different example, the presenter module 618 can share the remap content 402 dynamically in real time to other users of the navigation system 100 based on the operation mode 208 representing the online mode to leverage the distributed architecture of the navigation system 100.

The physical transformation from presenting the remap content 402 results in the movement in the physical world, such as people using the first device 102, the vehicle, or a combination thereof, based on the operation of the navigation system 100. As the movement in the physical world occurs, the movement itself creates additional information that is transformed from physical aspect to digital data for further generation of stored content 302, the remap content 402, or a combination thereof for the continued operation of the navigation system 100 and to continue the movement in the physical world.

The first software 526 of FIG. 5 of the first device 102 of FIG. 5 can include the modules for the navigation system 100. For example, the first software 526 can include the source module 602, the location module 604, the identification module 606, the proportion module 608, the removal module 612, the difference module 610, the generation module 614, the remapping module 616, the presenter module 618, or a combination thereof. The first control unit 512 of FIG. 5 can execute the modules to perform the functions dynamically and in real time.

The first control unit 512 can execute the first software 526 for the source module 602 receives the map content 202. The first control unit 512 can execute the first software 526 for the location module 604 to detect the current location 304. The first control unit 512 can execute the first software 526 for the identification module 606 to determine the content attribute 210. The first control unit 512 can execute the first software 526 for the proportion module 608 to determine the attribute proportion 310.

The first control unit 512 can execute the first software 526 for the difference module 610 to generate the map difference 404. The first control unit 512 can execute the first software 526 for the removal module 612 to remove the content attribute 210. The first control unit 512 can execute the first software 526 for the generation module 614 to generate the remapping attribute 406. The first control unit 512 can execute the first software 526 for the remapping module 616 to generate the remap content 402. The first control unit 512 can execute the first software 526 for the presenter module 618 to share the remap content 402.

The second software 542 of FIG. 5 of the first device 102 of FIG. 5 can include the modules for the navigation system 100. For example, the second software 542 can include the source module 602, the location module 604, the identification module 606, the proportion module 608, the difference module 610, the removal module 612, the generation module 614, the remapping module 616, the presenter module 618, or a combination thereof. The second control unit 534 of FIG. 5 can execute the modules to perform the functions dynamically and in real time.

The second control unit 534 can execute the second software 542 for the source module 602 receives the map content 202. The second control unit 534 can execute the second software 542 for the location module 604 to detect the current location 304. The second control unit 534 can execute the second software 542 for the identification module 606 to determine the content attribute 210. The second control unit 534 can execute the second software 542 for the proportion module 608 to determine the attribute proportion 310.

The second control unit 534 can execute the second software 542 for the difference module 610 to generate the map difference 404. The second control unit 534 can execute the second software 542 for the removal module 612 to remove the content attribute 210. The second control unit 534 can execute the second software 542 for the generation module 614 to generate the remapping attribute 406. The second control unit 534 can execute the second software 542 for the remapping module 616 to generate the remap content 402. The second control unit 534 can execute the second software 542 for the presenter module 618 to share the remap content 402.

The modules of the navigation system 100 can be partitioned between the first software 526 and the second software 542. The second software 542 can include the identification module 606, the proportion module 608, the difference module 610, the removal module 612, the generation module 614, and the remapping module 616. The second control unit 534 can execute modules partitioned on the second software 542 as previously described.

The first software 526 can include the source module 602, the location module 604, and the presenter module 618. Based on the size of the first storage unit 514, the first software 526 can include additional modules of the navigation system 100. The first control unit 512 can execute the modules partitioned on the first software 526 as previously described.

It has been discovered that the navigation system 100 having different configuration of a distributed architecture to actuate each module on the first device 102 or the second device 106 enhances the capability to generate the remap content 402, the stored content 302, or a combination thereof. By having the distributed architecture, the navigation system 100 can enable load distribution to receive the information related to the content attribute 210 to reduce congestion in bottleneck in the communication path 104 of FIG. 1 and enhance the capability of the navigation system 100. As a result, the navigation system 100 can improve the performance to control the traffic flow by presenting the remap content 402 for safer operation of the first device 102, the vehicle, or a combination thereof.

The first control unit 512 can operate the first communication unit 516 of FIG. 5 to transmit the map content 202, the current location 304, the content attribute 210, the attribute proportion 310, the map difference 404, the remapping attribute 406, the remap content 402, or a combination thereof to or from the second device 106 through the communication path 104 of FIG. 5. The first control unit 512 can operate the first software 526 to operate the location unit 520 of FIG. 5. The second control unit 534 can operate the second communication unit 536 of FIG. 5 to transmit the map content 202, the current location 304, the content attribute 210, the attribute proportion 310, the map difference 404, the remapping attribute 406, the remap content 402, or a combination thereof to or from the first device 102 through the communication path 104.

The navigation system 100 describes the module functions or order as an example. The modules can be partitioned differently. For example, the source module 602 and the presenter module 618 can be combined. Each of the modules can operate individually and independently of the other modules. Furthermore, data generated in one module can be used by another module without being directly coupled to each other. For example, the removal module 612 can receive the content attribute 210 from the identification module 606. Further, one module transmitting to another module can represent one module communicating, sending, receiving, or a combination thereof the data generated to or from another module.

The modules described in this application can be hardware implementation or hardware accelerators in the first control unit 512 or in the second control unit 534. The modules can also be hardware implementation or hardware accelerators within the first device 102 or the second device 106 but outside of the first control unit 512 or the second control unit 534, respectively as depicted in FIG. 5. However, it is understood that the first control unit 512, the second control unit 534, or a combination thereof can collectively refer to all hardware accelerators for the modules. Furthermore, the first control unit 512, the second control unit 534, or a combination thereof can be implemented as software, hardware, or a combination thereof.

The modules described in this application can be implemented as instructions stored on a non-transitory computer readable medium to be executed by the first control unit 512, the second control unit 534, or a combination thereof. The non-transitory computer medium can include the first storage unit 514, the second storage unit 546 of FIG. 5, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 7:
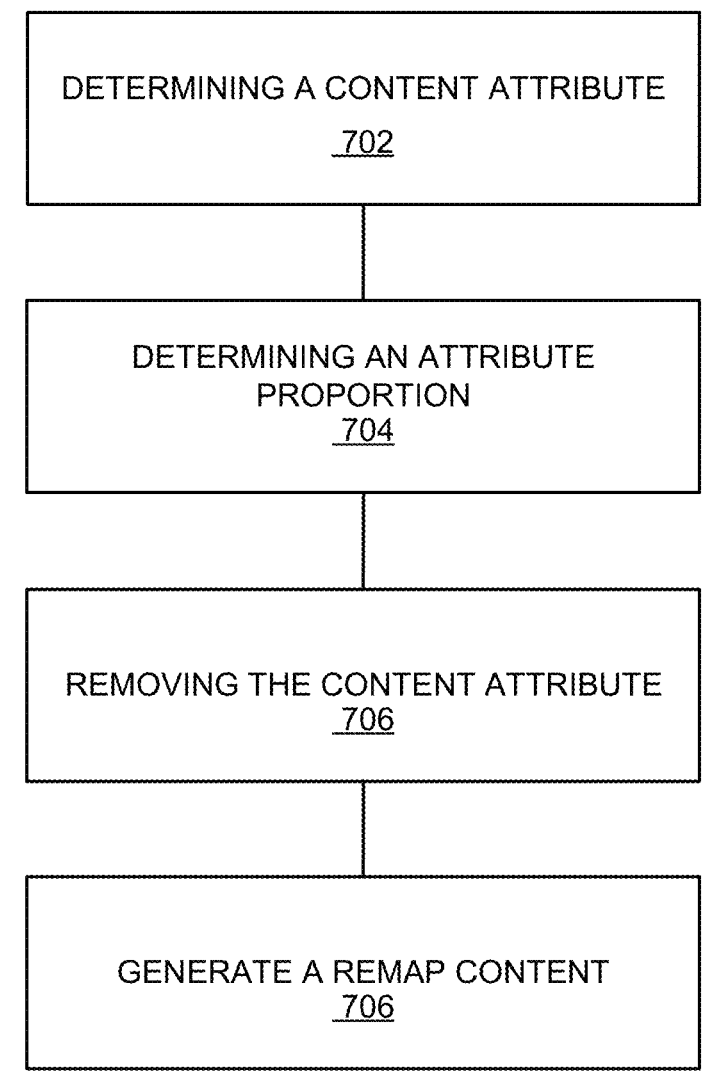
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: determining a content attribute based on an attribute index included in a map content in a block 702; determine an attribute proportion of the content attribute relative to a content dimension in a block 704; removing the content attribute with the attribute proportion meeting or exceeding a proportion threshold in a block 706; and generate a remap content based on a remaining instance of the content attribute for displaying on a device in a block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining multiple instances of a content attribute representing a feature of a map content based on an attribute index representing a listing of at least one instance of an attribute indicator wherein the attribute indicator represents a symbol to indicate the content attribute including a camping ground or a parking lot in the map content representing map information of a geographic area;
    determining an attribute proportion for each of the content attribute instances relative to a content dimension of the map content based on a control unit wherein the attribute proportion represents a percentage of a content coloration of the content attribute relative to the content dimension;
    removing a portion of the content attribute with the attribute proportion meeting or exceeding a proportion threshold unless the content attribute representing an attribute type having an attribute priority designated as non-removal even if the attribute proportion meets or exceeds the proportion threshold wherein the proportion threshold represents a maximum limit on the percentage of the content coloration of the content attribute relative to the content dimension; and
    generating a remap content including a remapping attribute dynamically and in real time based on at least one of remaining instances of the content attribute including the attribute priority designated as non-removal by plotting the remapping attribute at same location coordinates and a geographic scale as the content attribute of the map content including the camping ground or the parking lot for navigating the geographic area with the remap content while a device is offline.

2. The method as claimed in claim 1 wherein generating the remap content includes generating the remap content according to the geographic scale of the map content.

3. The method as claimed in claim 1 further comprising determining the content coloration based on the attribute index.

4. The method as claimed in claim 1 further comprising determining a background content based on the attribute proportion meeting or exceeding the proportion threshold.

5. The method as claimed in claim 1 wherein removing the content attribute includes removing the content attribute based on the attribute priority.

6. The method as claimed in claim 1 further comprising generating the remapping attribute based on the content attribute excluding a background content.

7. The method as claimed in claim 1 wherein generating the remap content includes generating the remap content based on the remapping attribute.

8. The method as claimed in claim 1 wherein removing the content attribute includes removing the content attribute based on the attribute type of the content attribute.

9. The method as claimed in claim 1 further comprising determining a map difference based on comparing the attribute proportion of the map content to the attribute proportion of a stored content.

10. The method as claimed in claim 1 further comprising determining multiple instances of a background content based on each of the attribute proportion instances for the content attribute meets or exceeds the proportion threshold.

11. A navigation system comprising:
a control unit including a processor for:
determining multiple instances of a content attribute representing a feature of a map content based on an attribute index representing a listing of at least one instance of an attribute indicator wherein the attribute indicator represents a symbol to indicate the content attribute including a camping ground or a parking lot in the map content representing map information of a geographic area;
determining an attribute proportion for each of the content attribute instances relative to a content dimension of the map content wherein the attribute proportion represents a percentage of a content coloration of the content attribute relative to the content dimension;
removing a portion of the content attribute with the attribute proportion meeting or exceeding a proportion threshold unless the content attribute representing an attribute type having an attribute priority designated as non-removal even if the attribute proportion meets or exceeds the proportion threshold wherein the proportion threshold represents a maximum limit on the percentage of the content coloration of the content attribute relative to the content dimension;
generating a remap content dynamically and in real time based on at least one of remaining instances of the content attribute including the attribute priority designated as non-removal by plotting the remapping attribute at same location coordinates and a geographic scale as the content attribute of the map content including the camping ground or the parking lot; and
a communication unit including a microelectronic, coupled to the control unit, for transmitting the remap content for navigating the geographic area with the remap content while a device is offline.

12. The system as claimed in claim 11 wherein the control unit is for generating the remap content according to the geographic scale of the map content.

13. The system as claimed in claim 11 wherein the control unit is for determining the content coloration based on the attribute index.

14. The system as claimed in claim 11 wherein the control unit is for determining a background content based on the attribute proportion meeting or exceeding the proportion threshold.

15. The system as claimed in claim 11 wherein the control unit is for removing the content attribute based on the attribute priority.

16. A non-transitory computer readable medium including instructions for execution, the instructions comprising:
determining multiple instances of a content attribute representing a feature of a map content based on an attribute index representing a listing of at least one instance of an attribute indicator wherein the attribute indicator represents a symbol to indicate the content attribute including a camping ground or a parking lot in the map content representing map information of a geographic area;
determining an attribute proportion for each of the content attribute instances relative to a content dimension of the map content wherein the attribute proportion represents a percentage of a content coloration of the content attribute relative to the content dimension;
removing a portion of the content attribute with the attribute proportion meeting or exceeding a proportion threshold unless the content attribute representing an attribute type having an attribute priority designated as non-removal even if the attribute proportion meets or exceeds the proportion threshold wherein the proportion threshold represents a maximum limit on the percentage of the content coloration of the content attribute relative to the content dimension; and
generating a remap content dynamically and in real time based on at least one of remaining instances of the content attribute including the attribute priority designated as non-removal by plotting the remapping attribute at same location coordinates and a geographic scale as the content attribute of the map content including the camping ground or the parking lot for navigating the geographic area with the remap content while a device is offline.

17. The non-transitory computer readable medium as claimed in claim 16 wherein generating the remap content includes generating the remap content according to the geographic scale of the map content.

18. The non-transitory computer readable medium as claimed in claim 16 further comprising determining the content coloration based on the attribute index.

19. The non-transitory computer readable medium as claimed in claim 16 further comprising determining a background content based on the attribute proportion meeting or exceeding the proportion threshold.

20. The non-transitory computer readable medium as claimed in claim 16 wherein removing the content attribute includes removing the content attribute based on the attribute priority.

* * * * *